United States Patent [19]
Dickson

[11] 3,939,871
[45] Feb. 24, 1976

[54] BURNER BLOCK ASSEMBLY

[75] Inventor: Fred D. Dickson, Sulphur Springs, Tex.

[73] Assignee: Rockwell International Corporation, Pittsburgh, Pa.

[22] Filed: Jan. 28, 1975

[21] Appl. No.: 544,801

[52] U.S. Cl. ......................................... 137/625.47
[51] Int. Cl.² ...................................... F16K 11/083
[58] Field of Search .................. 137/625.46, 625.47; 431/280

[56] References Cited
UNITED STATES PATENTS
2,909,217  10/1959  Lamal ....................... 137/625.47 X

*Primary Examiner*—Henry T. Klinksiek

[57] ABSTRACT

A burner block valve assembly for controlling the flow of oil and steam to a steam atomized oil burner which includes a tapered valve plug rotatable in a tapered bore of a valve body between an open burner ignited position and a closed burner extinguished position, the valve body including upper and lower diametrical ports having inlets respectively connected to an oil source and a steam source, and outlets commonly connected to the oil burner. Passages in the valve plug directly connect respective inlets and outlets in the open position to provide atomizing steam and oil to the burner tip, the steam passage including circumferential offset passage which provide steam flow to the burner tip in advance of oil flow as the valve plug is rotated to the open position thereby assuring atomizing steam prior to initial oil flow. The valve includes supplementary passageways which in the closed position route steam through both outlets to purge the oil line to prevent coking and also to provide steam at the tip for cooling purposes and further includes an oil bypass passage which recirculates oil to an oil return port to provide continuous oil flow thereby preventing stagnation when the oil burner is not ignited.

2 Claims, 3 Drawing Figures

U.S. Patent   Feb. 24, 1976   3,939,871
FIG. 1.
FIG. 2.
FIG. 3.
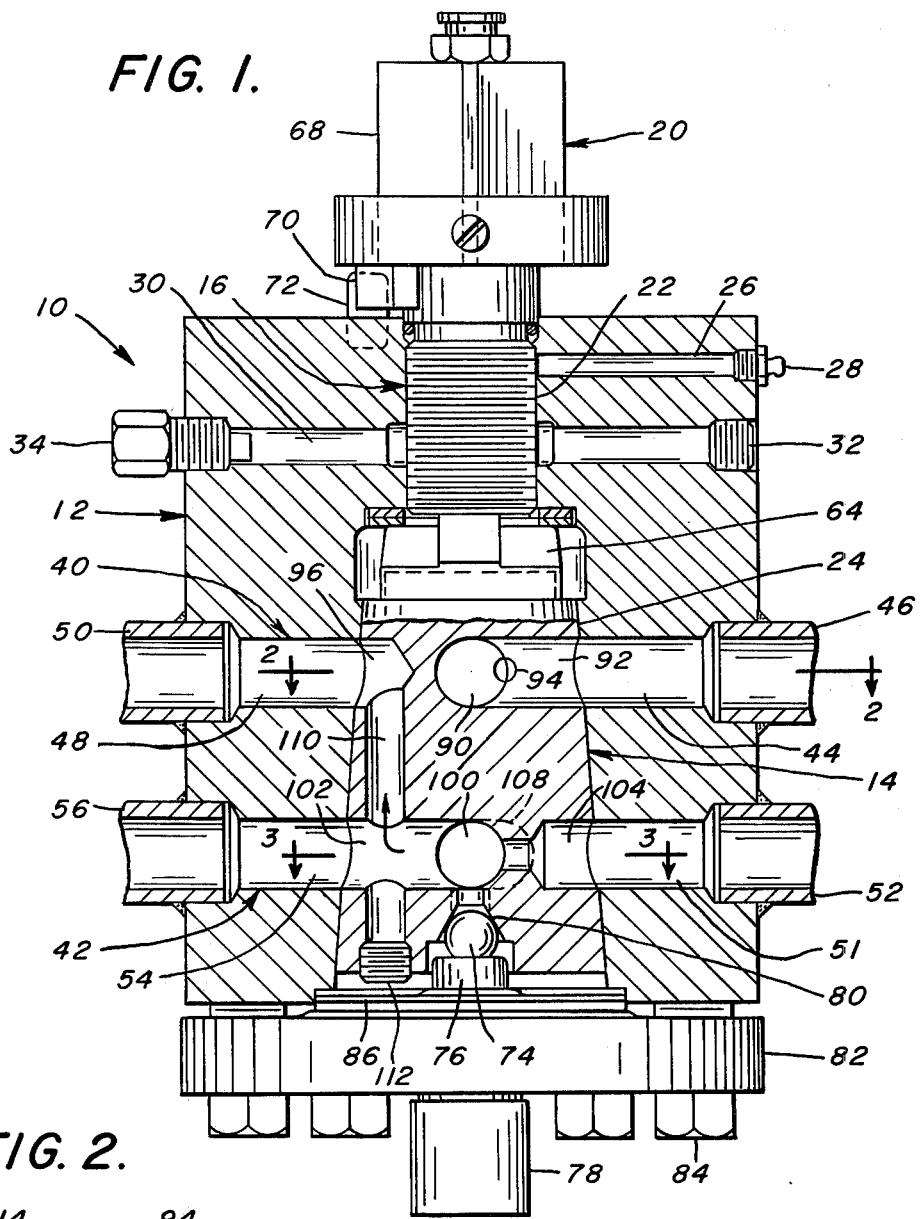
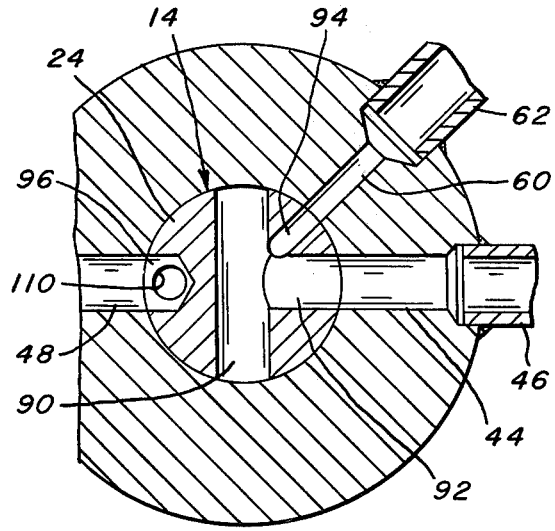
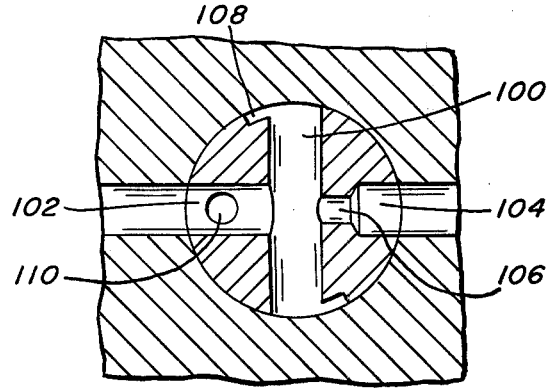

BURNER BLOCK ASSEMBLY

Background of the Invention

The present invention relates to valves for use with oil burners and, in particular, a burner block valve assembly controlling the flow of oil and steam to a steam atomized oil burner.

In oil burners using the steam atomization principle, steam is commonly supplied with oil at the burner tip to atomize the oil as it is forced therethrough. All the oil going through valve is burned and no surplus return is provided. To assure complete initial atomization, for good ignition, I have found it is desirable to allow steam to arrive at the burner tip slightly before the oil flow. Also, I have determined that since there is no surplus return line, it is necessary to purge the oil line during the periods when the burner is not ignited. I have also found that to prevent stagnation in the oil supply line when the valve is in the closed position, a continuous oil flow should be provided.

In accordance with the above objectives, the present invention provides a simplified burner block valve structure which, in a single assembly, incorporates the aforementioned supply, atomization, purging, and recirculation functions. More particularly, the burner valve block assembly comprises a tapered valve plug rotatable between open and closed positions within a tapered bore in a valve body. The valve body includes upper and lower diametrical throughports respectively having inlets communicating with an oil source and a steam source and outlets commonly connected upstream of the burner tip. An oil bypass return port communicates with the bore adjacent the upper oil inlet. The valve plug includes upper and lower diametrical through passages providing direct fluid communication with the respective inlets and outlets in the open position, thereby supplying oil and steam to the burner tip for ignition. Additionally, to provide the aforementioned advance flow of steam, the lower plug passage includes circumferential offset passages which provide for advance steam flow as the valve plug is moved to the open position. In the closed position, the plug has an upper passageway fluidly connecting the oil inlet with the oil return loop for continuous recirculation of the oil supply to prevent oil stagnation through the cooling of the viscous fuel oil. The plug includes a second passageway fluidly connecting the steam inlet with the steam outlet in the closed position via a restricted orifice and additionally with an intersecting axial passage communicating with the oil outlet. The reduced steam flow through the oil and steam lines thereby purges the excess oil to prevent coking and also provides steam for cooling the burner tip. In this manner within a single assembly, the multiple functions of supply, atomization, purging and recirculation are incorporated into a single valve structure.

The above and other features of the present invention will be apparent to those skilled in the art upon reading the following detailed description taken in conjunction with the accompanying drawings illustrating the preferred embodiment in which:

Description of the Drawings

FIG. 1 is a cross-sectional view of a burner block valve assembly made in accordance with the present invention showing valve in the closed purging and recirculation position;

FIG. 2 is a view taken along line 2—2 showing the porting for oil recirculation and steam purging through the oil line; and FIG. 3 is a view taken along line 3—3 of FIG. 1 showing the porting for supplying purging steam to the oil and steam lines.

Description of the Invention

Referring to the drawings, and in particular FIG. 1, there is shown burner block valve assembly 10 made in accordance with the present invention which is operative as hereinafter explained to selectively distribute oil and steam to burner tip of an oil burner of the steam atomization type. In such a system, steam is used to break up and atomize the oil as it is forced through the burner tip.

The valve assembly 10 generally comprises a valve body 12, a valve plug 14, a valve stem 16, and a stop collar 20. The valve body 12 is cylindrical with a circular cross-section and includes an upper axial circular passage 22 which rotatably journals the valve stem 16 and a lower frusto-conical valve bore 24 which rotatably journals the valve plug 14 and is coaxial with the passage 22. The larger end of the bore 24 is at the lower surface of the valve body 12.

The valve body 12 further includes a radial lubrication passage 26 adjacent the upper surface thereof, the outer end of which is closed by a grease fitting 28 supplying lubricant to the valve stem 22. A diametrical packing passage 30 is located axially intermediate the stem 22. The passage 30 has one end closed by a pipe plug 32 and the other end closed by a packing injector 34.

The valve body 12 further includes upper and lower supply ports 40 and 42 extending diametrically through valve body 12 axially between the upper and lower surfaces of the valve plug 14. The ports 40 and 42 outwardly terminate with counterbores which receive pipes leading to and from various components of the oil burner supply system. More particularly, the upper ports 40 includes an inlet oil supply passage 44 supplied with oil through an oil supply pipe 46 leading to a source of oil (not shown) and an oil distribution passage 48 connected to the burner tip (not shown) by an oil distribution pipe 50. The lower port 42 includes a steam inlet passage 51 connected to a source of steam (not shown) by a steam supply pipe 52 and a steam distribution passage 54 connected to the burner tip by a steam distribution pipe 56. Further, as shown in FIG. 2, and oil bypass port 60 in the valve body intersects the bore 24 in the same axial plane as oil supply passage 44 angularly disposed at about 45° with respect thereto. A counterbore formed at the outer end of the bypass port 60 receives an oil return pipe 62 which is connected to the oil source.

The inner end of the stem 22 is rotatably connected to the valve plug 14 at a coupling collar 64. The adjusting collar 20 is retained at the projecting outer end of stem 22. The outer end of the stem 22 is provided with square head section 68 adapted to receive an adjusting tool such as a wrench for rotating the collar 20 and the plug approximately 90° between an open burner igniting position and a closed burner extinquished position. The limits of permissible movement are established by coaction between the stop tang 70 on the collar 20 and a pair of stop pins 72 carried on the upper surface of the valve body 12.

The valve plug 14 has a frusto-conical outer surface closely conforming to the frusto-conical bore 24. The plug 14 is held in the bore 24 by means of thrust ball 74 and thrust washer 76 which are adjustable axially by an adjusting mechanism 78 that forces the ball against the inner surface of a frusto-conical surface 80 formed at a lower surface of the plug 14. Adjustment effects secure seating engagement between the plug 14 and the bore 24. The adjusting mechanism 78 is carried by a cover plate 82 which is fixedly secured to the lower surface of the valve body 12 by means of six bolts 84. A flexible diaphragm 86 seals the space between the end cover 82 and the valve body 12.

The plug 14 is provided with various passageways for selectively connecting pipes 46, 52, 56 and 50 to supply steam and oil therethrough. More particularly, the upper section of the plug is provided with a passage network comprising, as shown in FIG. 2, a diametrical throughpassage 90 intersected at right angles by a branch passage 92 and an angularly intersecting bypass passage 94 of reduced diameter. A shallow radial non-intersecting passage 96 is formed in the outer surface of the plug 14. The passage 96 is radially spaced from the passage 90 and is diametrically opposite passage 92. In the illustrated closed position, the passage 92 is aligned with oil supply passage 44, the passage 96 is aligned with the oil distribution passage 48, and the passage 94 is aligned with the bypass port 60. In the non-illustrated open position which is rotated 90° counterclockwise therefrom the passage 90 connects the passage 44 and 48 while the port 60 is blocked by the outer surface of the plug 14.

The lower section of the plug 14 is provided with the distribution network shown in FIG. 3 wherein a diametrical passage 100 is intersected at right angles by a radial steam outlet passage 102 and a radial steam inlet passage 104 including a reduced diameter orifice 106.

The outer ends of the passage 100 are provided with shallow semicircular circumferentially offset recesses 108. The recesses which are offset counterclockwise from the axis of the passage 100.

Additionally, an axial passage 110 is drilled from the bottom surface of the plug 14 and intersects passages 96 and 102. The lower end of the passage 110 is sealed by a plug 112.

The burner block assembly above-described is manually rotatable by adjusting the collar 20 between an open burner ignited position and a closed burner extinguished position. At these positions, the assembly provides a fuel atomizing mode, a purging mode, and an anti-stagnation flow mode. More particularly, in the closed position herein illustrated, oil from the source flows through the oil supply pipe 46, the oil supply passage 44, passage 92, passage 94, port 60 and pipe 62 in an oil bypass route. This provides for continuous circulation of the fuel oil and prevents stagnation of the oil supply between the supply header and the valve when the burner is not ignited. Also, in this position, steam is supplied from the source through pipe 52, passage 51, passage 104, orifice 106 wherein the flow rate is reduced and outwardly through passage 102, passage 42, pipe 56, and in a branch passage leading from passage 102, through passage 110, passage 96, passage 48 and oil distribution pipe 50. Therein, oil in the supply line 50 is purged by the flowing steam which purges the oil line to prevent coking and also provides steam through the distribution lines to cool the burner tip during the non-ignition period. When it is desired to light the burner, the operator rotates the collar 20 to move the plug to the non-illustrated open position. Therein oil is supplied from the source through oil supply pipe 46, passages 44, 90, 48, and oil supply pipe 50 to the burner tip. Steam is supplied from the steam source through steam supply pipe 52, passages 51, 100, 42 and steam distribution pipe 56. By virtue of the offset recesses 108, steam is allowed to flow into the pipe 56 in advance of the opening of the flow passage to the oil supply line. Accordingly, steam is preliminarily delivered to the top to secure complete atomization of the fuel oil. Thus, with a single valve assembly, I have provided an accurately, and simply sequenced valve in which a single valve plug controls the supply of steam and oil in a steam atomization oil burner system.

While the present invention has been set forth with respect to a particular embodiment selected for descriptive purposes, it will be appreciated that other modifications and embodiments thereof will be obvious to one skilled in the art. Accordingly, the scope of the invention is to be limited only by the following claims:

I claim:

1. A burner block valve assembly for selectively distributing oil and steam to a steam atomized oil burner, comprising:
    a valve body having a bore therein;
    a valve plug in the bore rotatable between first and second positions;
    an oil inlet in the body communicating with the bore for fluid connection with the oil source;
    a steam inlet in the body communicating with the bore for fluid connection with the steam source;
    an oil bypass port in the body communicating with the bore for fluid connection with the oil source;
    a first outlet port in the body communicating with the bore for fluid connection with the burner;
    a second outlet port in the body communicating with the bore for fluid connection with the burner;
    first passage means in the plug establishing in the final position a fluid connection between the oil inlet and the first outlet for supplying oil thereof through the valve from the oil source and the burner, and establishing in the second position a fluid connection in an oil bypass route between the oil inlet and the oil bypass port;
    second passage means in the plug establishing in the first position a fluid connection between the steam inlet and the second outlet for supplying steam from said steam source to the burner and including supplementary passage means for establishing the fluid connection in advance of the communication between the oil source and the burner through said first passage means, said second passage means establishing in said second position a fluid connection between the steam source and the first outlet for routing purging steam through the latter;
    whereby steam and oil are supplied through the valve in the first position and purging steam is delivered to both outlets in the second position with oil flowing through the bypass route to prevent oil stagnation, return of the plug to the first position providing steam at the burner through said supplementary passage means in advance of oil.

2. In a steam atomization oil burner system, a burner block valve assembly for controlling the flow of oil from an oil source and steam from a steam source for selective distribution to an oil burner, comprising: a valve body; an axially extending bore in the valve body;

a valve plug rotatably disposed in the bore; a stem connected to the valve plug for rotating the latter between an open position and a closed position; an upper passage extending diametrically through the valve body, said upper passage having an oil inlet communicating with the bore for fluid connection with the oil source and an oil outlet communicating with the bore for fluid connection with the burner; a lower passage extending diametrically through the valve body, said lower passage having a steam inlet communicating with the bore for fluid connection with the steam source and a steam outlet communicating with the bore for fluid connection with the burner; an oil bypass port in the body communicating with the bore in the same plane as the upper passage for fluid connection with the oil source; a first diametral passage in the upper portion of the valve plug for directly connecting the oil inlet and the oil outlet in the open position; a second radial passage intersecting said first passage for fluid connection with the bypass port in said closed position; a third radial passage in the valve plug intersecting said first passage for connection with the oil inlet in said open position; a fourth radial passage spaced from said first diametral passage and coaxial with said second radial passage for connection with said oil outlet in said closed position; a fifth diametral passage in the lower portion of said valve plug for directly connecting the steam inlet and the steam outlet in said open position, said fifth diametral passage including circumferentially offset semi-circular recesses providing advance opening of the fifth diametral passage in advance of direct fluid communication therewith and prior to opening of the first diametral passage; sixth diametral passage intersecting said fifth diametral passage including an orifice directly connecting the steam inlet and the steam outlet in the closed position; a seventh axial passage extending axially through the valve plug intersecting said sixth diametral passage and said fifth diametral passage for completing a branch fluid connection between the steam inlet and the oil outlet in the closed position, whereby the open position steam and oil are directly routed through the valve between the inlets and respective outlets to the burner for ignition thereof and, in said closed position steam is commonly routed from the steam inlet through the oil outlet and steam outlet for providing purging of the latter and supplying cooling steam to the burner through the former, with oil flowing through the oil bypass port to maintain continuous circulation thereof to prevent stagnation in the oil supply line.

* * * * *